July 15, 1969

J. I. MAGERS 3,455,573

TIEDOWN UNIT

Filed July 5, 1968

INVENTOR.
JOSEPH I. MAGERS
BY
Harry C. Jeans.
ATTORNEY

United States Patent Office 3,455,573
Patented July 15, 1969

1

3,455,573
TIEDOWN UNIT
Joseph I. Magers, Westminster, Calif., assignor of one-
half to Ellis R. Carr, Westminster, Calif.
Filed July 5, 1968, Ser. No. 742,649
Int. Cl. B60p 7/08
U.S. Cl. 280—179                                      9 Claims

ABSTRACT OF THE DISCLOSURE

A tiedown unit for use in the stake pocket of trucks, serving to fasten a load thereon and capable of tying down a load whose width exceeds that of the truck box, includes a frame which fits in the stake pocket of the truck and a clamp lever pivoted on the frame and movable so that the lever may be forced against one side of the stake pocket while the frame is forced against the other side of the stake pocket. It also includes a cam for forcing clamp lever rotation relative to the frame and a cam actuating member extending laterally from the frame. The cam actuating member provides a structure which may be tied to the load and which actuates the cam to fix the tiedown unit solidly to the truck.

---

This invention relates to improvements in tiedown units for disposition in a stake pocket of a truck. It relates particularly to a tiedown unit suitable for use with pickup trucks and other vehicles whose stake pockets are mounted or disposed on the inner wall of a truck box.

An object of the invention is to provide an improved tiedown unit which can utilize the stake pockets of a truck to hold down, upon the truck, a load whose width exceeds that of the truck box.

The "camper" structure often associated with pickup trucks is an example of such a load. A camper is a portable shelter designed for association with pickup trucks. While available in many sizes and shapes, most campers have a lower portion which fits within the bed of a pickup truck and an upper portion of greater width which extends above the truck box. While the invention has broader use, it is particularly well suited to that application. Accordingly, the specific embodiments of the invention selected for illustration in the drawing and for detailed description below are especially arranged for that application.

Other objects of the invention are to provide a tiedown unit which is dependable, and is inexpensive to manufacture. Another object of the invention is to provide a tiedown unit which is readily and inexpensively modified to permit its employment with stake pockets of varying dimension and design. Another object of the invention is to provide a tiedown unit which may be conveniently and quickly connected and disconnected to facilitiate the removal and reinstallation procedure when the load is removed from and reinstalled on the truck from time to time.

These and other objects and advantages of the invention which will hereinafter appear are realized in part by the provision, in a tiedown unit for disposition in a truck stake pocket, of a unit having a frame of width and thickness to fit slidably in the longitudinal direction within the stake pocket of a truck and which includes a surface engageable with one wall of the stake pocket, by the provision of a clamp lever mounted on the frame and rotatable relatively thereto in a direction opposite said surface sufficiently to engage an opposite wall of the stake pocket, by the provision of cam means for forcing clamp lever rotation in said direction sufficiently to engage said opposite side of the stake pocket including a cam interposed between the frame and lever, and by the provision of cam actuating means comprising a tiedown member extending laterally from the frame for actuating the cam means as an incident to the application of force to the tiedown member.

Figure 1:
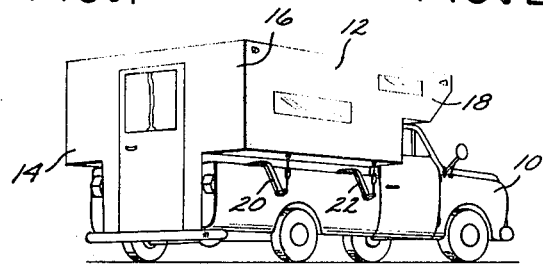
FIGURE 1 is an isometric view of a pickup truck upon which a camper is mounted and of portions of two tiedown units by which the camper is secured to the truck and which embody the invention.

Referring to FIGURE 1 of the drawing, there is shown a truck 10 of a type commonly called a "pickup" truck, the body portion of which defines a truck box at the rear of the cab. The rear gate of the box has been removed from the truck 10 to make accessible the rear wall of a camper unit which is mounted on the truck box. The camper 12 as shown in FIGURE 1, is similar to most campers in that the lower portion of the camper substantially entirely fills the truck box. The floor of the camper, not shown, is an integral part of the camper and rests upon the bed of the truck. Just above the sides of the truck box camper width is increased at both sides to provide a sideward extension 14, at the left in FIGURE 1, and a sideward extension 16, at the right in FIGURE 1. The forward upper portion of many campers is made to extend over the cab of the truck upon which the unit is mounted. Such an extension is included in the camper 12 illustrated in FIGURE 1 where it is numbered 18. The camper is generally quite heavy and, as will be apparent in FIGURE 1, it tends to be top heavy.

Two hold-down units, designated by numerals 20 and 22, respectively, are illustrated in FIGURE 1. They serve to connect the truck box to the load which in this case is the camper 12. The units are arranged to fit within the stake pockets of the truck while permitting attachment to the load at a point outside, in terms of width, of the truck load.

There is provided in the invention a frame of width and thickness to fit slidably, in a longitudinal direction within a stake pocket of a truck and including a surface engageable with one wall of the stake pocket. In the preferred form of the invention the frame comprises a channel shaped structure in which a rectangular plate is connected at its elongate edges to respectively associated, generally rectangular elongate side plates which are disposed perpendicular to the rear plate and parallel to one another. Thus, the frame may be formed of a length of steel channel. The channel should be selected so that the width of the rear plate portion is only slightly less than the width of the stake pocket in which it is to be inserted. The depth of the side walls of the channel must be less than the depth of the stake pocket but its depth is not otherwise critical.

Figure 2:
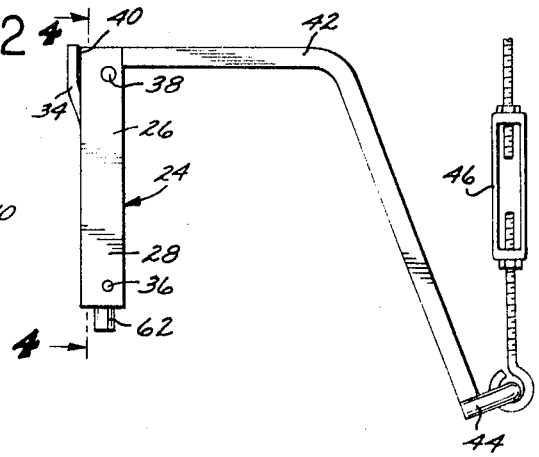
FIGURE 2 is a view in side elevation of a tiedown unit embodying the invention.
Figure 4:
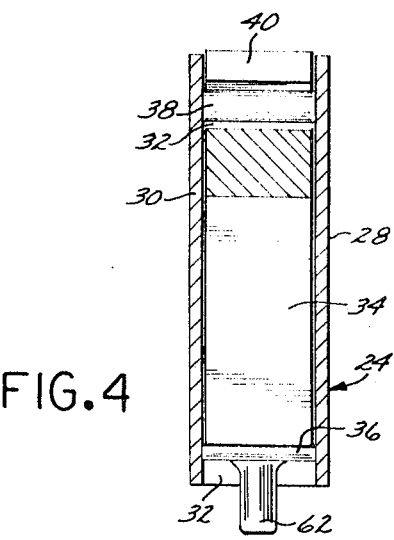
FIGURE 4 is a cross-sectional view of the tiedown unit taken on line 4—4 of FIGURE 2.

Referring to FIGURE 2 of the drawing, there is shown a tiedown unit generally designated 24 whose frame 26 is oriented so that one side 28 is visible in the drawing. For the sake of clarity, the dimension of the frame across the side wall 28 from left to right in FIGURE 2 is designated as the "depth" of the frame. The dimension in FIGURE 2 from the bottom of the frame to its top is called its "heighth." The third dimension of the frame is the width and is the dimension, in FIGURE 4, which extends from the outer surface of the right wall 28 to the outer surface of the left wall 30. One surface of the tiedown unit frame is engageable with the side wall of the stake pocket. In the case of frame 24, this surface comprises the rear plate or wall 32.

The unit further comprises a clamp lever mounted upon the frame so that it is rotatable relative to the frame in a direction opposite the surface which engages one wall of the stake pocket. It is rotatable sufficiently to engage the wall of the stake pocket opposite that one wall. The embodiment illustrated in FIGURE 2 includes such a clamp lever. It is designated 34. Advantageously, the clamp lever has pivotal connection to the frame at a point below the upper portion of the frame and the clamp lever extends upwardly to the region of the upper portion of the frame. Lever 34 is so arranged. A pin 36 extends entirely through the frame from one side wall 28 to the other 30 at the lower portion of the frame. The clamp lever 34 is secured by any convenient means, such as by welding as shown, to the pivot pin 36 so that the lever 34 is disposed lengthwise of the frame between the side walls 28 and 30.

Figure 3:
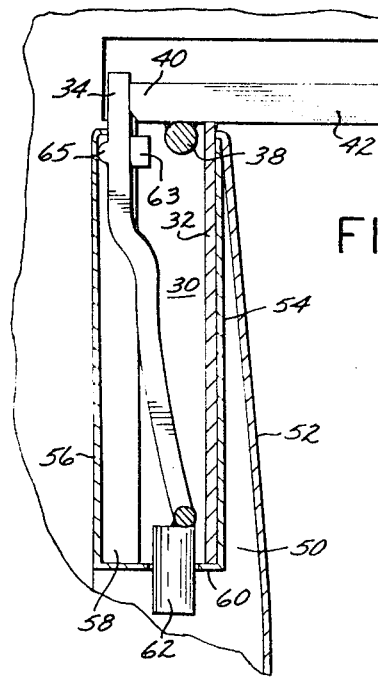
FIGURE 3 is a view of a tiedown unit embodying the invention shown in association with a pickup truck and a camper, a portion of the frame of the tiedown unit and a portion of the pickup truck and its stake pocket being shown in cross-section, and in which the camper is shown fragmented.

A cam means is provided in the invention for forcing clamp lever rotation in the direction opposite said surface of the frame sufficiently to engage the opposite side of the stake pocket. This means includes a cam interposed between the frame and the clamp lever. Movement of the cam provides a camming action to force the lever and frame apart into engagement with a pair of opposite sides of the stake pocket. The cam may be mounted upon the lever or upon the frame and the camming surface may be provided on the lever or the cam or on the frame. Moreover the camming action may be the result of rotational or longitudinal movement of the cam. Advantageously, as shown in the preferred embodiments selected for illustration in the drawing, the cam member is mounted upon the frame and camming action is provided by rotational movement of the cam. In FIGURE 3, the cam is mounted for rotation upon a pivot pin 38 which extends entirely through the side members 28 and 30 in the upper region of the frame 24. The cam 40 is secured by any convenient means, such as by welding as shown, to the pivot pin 38 so that it extends into engagement with the upper end of the clamp lever 34. The surface of the cam which engages the lever as the cam is rotated is arranged so that different portions of the surface lie at different distances from the axis of rotation of the cam to provide a camming action. The camming action may be augmented, as it is in the embodiment illustrated, by arranging the surface of the lever over which camming action takes place such that different portions of that surface have different distances from the axis of cam rotation. Both of these expedients are employed in both of the embodiments illustrated in the drawings.

A cam actuating means is provided in the invention which comprises a tiedown member which extends laterally from the frame and which actuates the cam means as an incident to the application of force to the cam actuating means. Referring to FIGURE 3 of the drawing the cam actuating means 42 there shown extends laterally from the frame 24 at the rear (the side of the frame defined by rear plate 32) of the frame. As best shown in FIGURE 3 the cam actuator is advantageously formed integrally with the cam. In this embodiment a rectangular steel bar is laid atop the pivot pin 38 so that one of its broad sides faces the pin and so that its end 40 extends to the position in which the clamp lever 34 is to be engaged. Thus arranged, the bar is secured to the pin. A camming action to separate the clamp lever and frame should result from force applied upwardly to the tiedown member and the construction described provides this result. Force applied upwardly to the tiedown member 42 rotates the cam 40 counterclockwise, in FIGURES 2 and 3, in response to pressure or force tending to lift the tiedown member 42.

To facilitate its use in those instances where the sideward extension of the load occurs only a short space above the upper wall of the truck box, the cam actuating lever or tiedown member advantageously extends downwardly as well as laterally. It is preferred that the downward extension be considerable and extend at least to a position opposite the lower end of the frame although this feature is not essential to successful practice of the invention. The usefulness of this feature is apparent from examination of FIGURE 1 where it enables the use of ordinary turnbuckles which extend from the outer extreme end of the tiedown member to a connection near the side edges of the load above. Advantageously, as illustrated in FIGURE 2, the outer end of the tiedown member 42 is provided with a ring or loop 44 to which the turnbuckle assembly 46 is conveniently connected.

The tiedown unit is shown as assembled in a truck stake pocket in FIGURE 3. The stake pocket is mounted by a bracket 50 to the inner side of the truck body wall 52. It comprises an elongate tube rectangular in horizontal cross-section with two opposite walls extending in a direction parallel to the lengthwise direction of the truck and the other pair of walls extending parallel to one another and vertically in a direction athwart the truck. In FIGURE 3, the pair of perpendicular walls 54 and 56 lie in planes which extend in the lengthwise direction of the truck. Only one side wall 58 is visible in FIGURE 3 because the side view has been sectioned through the stake pocket. In practice, the stake pockets of trucks extend from four to six or seven inches in length and their upper margin extends to the level of the upper edge of the truck box. In most instances the upper margins of the pocket are turned or rolled to form a narrow, inwardly projecting lip. In many trucks the stake pocket is provided with a bottom wall and the wall, when provided, is formed with an opening by which water may drain away. In the stake pocket illustrated in FIGURE 3 an end wall 60 is provided and its drain opening is utilized to lend stability to the tiedown unit. A short length of cylindrical rod 62 is secured by any convenient means, as by welding as shown, to the pivot pin 36 so that the rod extends below the lower edge of the frame 24 through the drain hole opening. Inclusion of the rod has no dilatorous effect when used with a stake pocket that does not have a lower cover.

In this embodiment the lever 34 and cam 40 are arranged so that the lever 34 engages the inner surface of wall 56 of the stake pocket at the side of the pocket away from the outside wall of the truck box. The rear plate 32 of the frame engages the outside wall 54 of the stake pocket at the upper lip and at its lower end. It will be apparent that a force applied upwardly against the tiedown member 42 in a direction to rotate it counterclockwise will result in counterclockwise rotation of cam 40 such that lever 34 will be moved in the direction away from rear plate 32 and the frame. The clamp lever 34 is pressed against the opposite wall 56 of the stake pocket when the frame 32 is pressed against the wall 54. This action fixes the tiedown unit to the truck body whereby the load will be held in place on the truck by interconnecting the load with the tiedown member 42.

The cam actuating lever may, as in the embodiments shown, be much longer than the cam resulting in substantial mechanical advantage. Lest the stake pocket be unduly distorted by the application of excessive force to the lever a stop may be provided to limit lever rotation. In FIGURE 3, the stop 63 serves to limit rotation of lever 42. It is formed or attached to the clamp lever 34. In this case, it is secured to the lever by welding.

In FIGURE 3, as an aid to safety, a ridge 65 is formed across the outer face of the clamp lever. This ridge may be only a weld bead, as shown, positioned at or below the upper rim of the stake pocket.

Figure 5:
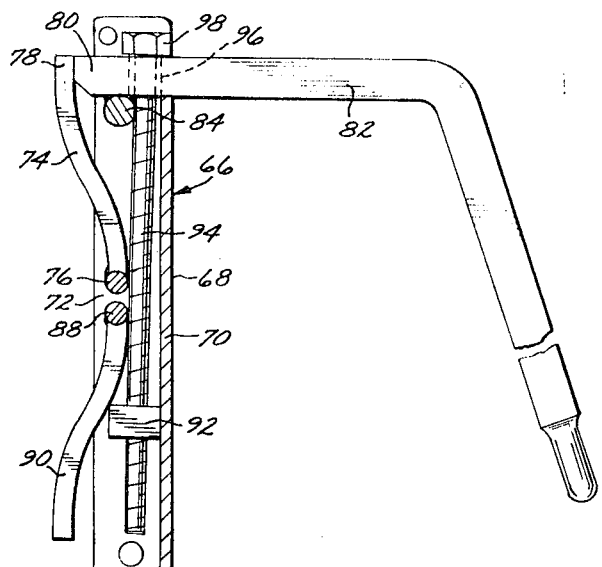
FIGURE 5 is a side view of a modified form of tiedown unit embodying the invention in which the frame and its pivot pins have been sectioned to show the internal construction of the unit.

The embodiment of the invention illustrated in FIGURE 3 has demonstrated itself to be entirely practical and operative. However, in some applications, it may be desirable to distribute the clamping forces over a greater area of the stake pocket wall. This result is achieved in the modification illustrated in FIGURE 5. This unit, which is generally designated 66, comprises a frame 68 formed of a length of steel channel material. The rear wall 70 of the channel and one side wall 72 of the channel are visible in FIGURE 5. This embodiment of the invention includes a clamp lever 74 pivotally mounted upon the frame by a pivot pin 76 which extends through an opening in the two side walls of the frame. The upper end 78 of the upper clamp lever terminates near the upper portion of the frame where it is engageable by a cam 80. This cam is integrally formed with a tiedown member 82, the two elements being formed of a single elongate bar of metal which rests upon a pivot pin 85 which extends through openings in the side walls of the frame 68. The cam and tiedown member are secured to the pivot pin 84 by any convenient means, such as by welding as shown. This embodiment of the invention includes a second clamp lever which has pivotal connection to the frame in the mid-area of the frame just below the pivot pin 76. A second pin 88 extends through openings in the side walls of the frame 68 at a point just below pin 76. The second clamp lever 90 is secured by any convenient means to that pin. Means are provided in this embodiment for forcing rotation of the second clamp lever in a direction away from the rear plate 70 of the frame 68. This means comprises a cam and means for producing a camming action tending to force rotation of the lower clamp lever. In the embodiment shown the cam comprises a rectangular bar of dimensions to fit between the side walls of the frame and having a central bore threaded to receive, in its threads, the threads of a rod which extends upwardly to the upper end of the frame. The bar 92 serves as a nut whose dimensions preclude it from rotating when it is disposed within the frame. It is advanced along the threads of the drive rod 94 when the latter is turned. A camming action is produced because the nut 92 engages the clamp lever 90 at one side and the rear wall 70 of the frame at its other side. Camming action is also produced when the drive rod 94 is moved longitudinally relative to the frame. At a point adjacent the pivot pin 84, the tiedown member 82 is provided with an opening through which the drive rod 94 extends. The upper end of the drive rod has dimension exceeding the size of that opening. Thus, when the tiedown lever 82 is raised it will push against the upper end of the drive rod 94 forcing the drive rod and the nut 92 upwardly to effect a camming action in which the lower clamp lever 90 is rotated in a direction away from the rear wall 70 of the frame. On the other hand, the rod 94 is freely rotatable in the opening 96 of the tiedown member through which it extends. This arrangement permits initial adjustment of the nut 92 by rotation of the head 98 of rod 94 whereby the unit can be adjusted so that substantially equal pressure is applied to the stake pocket wall when the lever 82 is lifted.

Although I have shown and described certain specific embodiments of my invention, I am fully aware that many modifications thereof are possible.

I claim:
1. A tiedown unit for disposition in the stake pocket of a truck comprising in combination:
   a frame of width and thickness to fit slidably within the stake pocket of a truck and including a surface engageable with one wall of the stake pocket;
   a clamp lever mounted on said frame and rotatable relative thereto in a direction opposite said surface;
   cam means for forcing clamp lever rotation in said direction opposite said surface sufficiently to engage the opposite side of the stake pocket including a cam interposed between said frame and said clamp lever; and
   cam actuating means comprising a tiedown member extending laterally from the frame for actuating said cam means.

2. The invention defined in claim 1, in which said cam is rotatably mounted, adjacent the upper end of said tiedown unit upon one of said frame and said clamp lever.

3. The invention defined in claim 2, in which said cam actuating means comprises a lever connected to said cam and extending laterally from said frame and downwardly to a point opposite the lower portion of said frame.

4. The invention defined in claim 3, in which said clamp lever has pivotal connection to said frame and extends from said connection upwardly to the level of the upper portion of said frame.

5. The invention defined in claim 1, in which said clamp lever has pivotal mounting upon said frame at a point below the upper end of said frame and extends upwardly to the region of said upper end; and in which said cam is rotatably mounted upon said frame in said upper region of the frame; and in which said cam actuating means comprises a lever connected to said cam.

6. The invention defined in claim 5, including a second clamp lever mounted on said frame and rotatable relative to said frame in a direction opposite said surface; and second cam means for forcing rotation of said second clamp lever in said direction opposite said surface sufficiently to engage the opposite side of the stake pocket including a cam interposed between the frame and said second clamp lever.

7. The invention defined in claim 6, including second cam actuating means for actuating said second cam means independently of actuation of said cam means first mentioned.

8. The invention defined in claim 7, including means for rendering said cam actuating means effective simultaneously to actuate said cam means first mentioned and said second cam means.

9. The invention defined in claim 8, in which said means for rendering said cam actuating means effective comprises a member connected to said second cam means and engageable with said tiedown member when the latter is moved to actuate said cam means first mentioned.

References Cited

UNITED STATES PATENTS

| | | | |
|---|---|---|---|
| 1,280,670 | 10/1918 | Cornell | 296—43 |
| 3,356,408 | 12/1967 | Stutz | 296—23 |

LEO FRIAGLIA, Primary Examiner

R. R. SONG, Assistant Examiner

U.S. Cl. X.R.
296—23, 35, 43